Aug. 23, 1932.  R. MIYATA  1,872,784
DEVICE FOR THE WARP STOP MOTION
Filed March 13, 1931  6 Sheets-Sheet 3
Fig. 6.
Fig. 5.
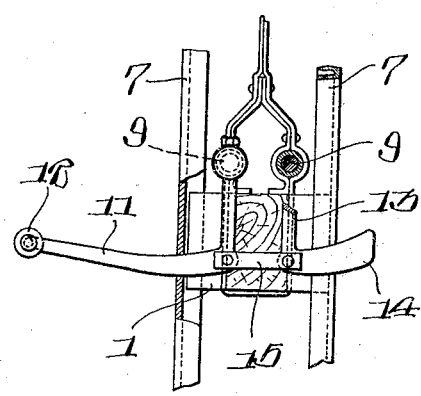
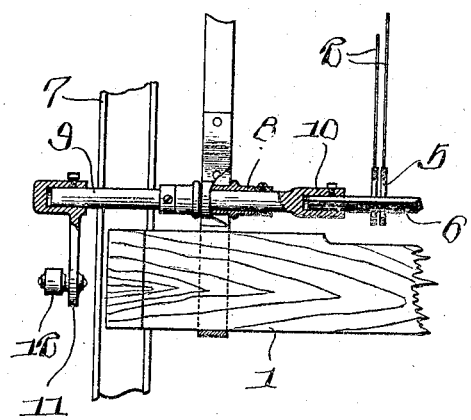
Fig. 7.
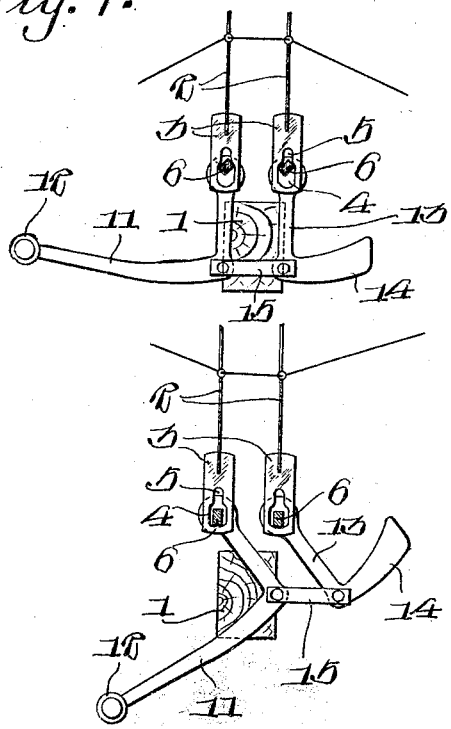
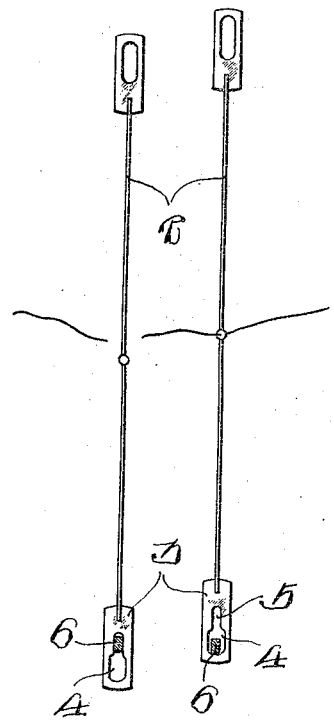
Fig. 8.
Fig. 9.

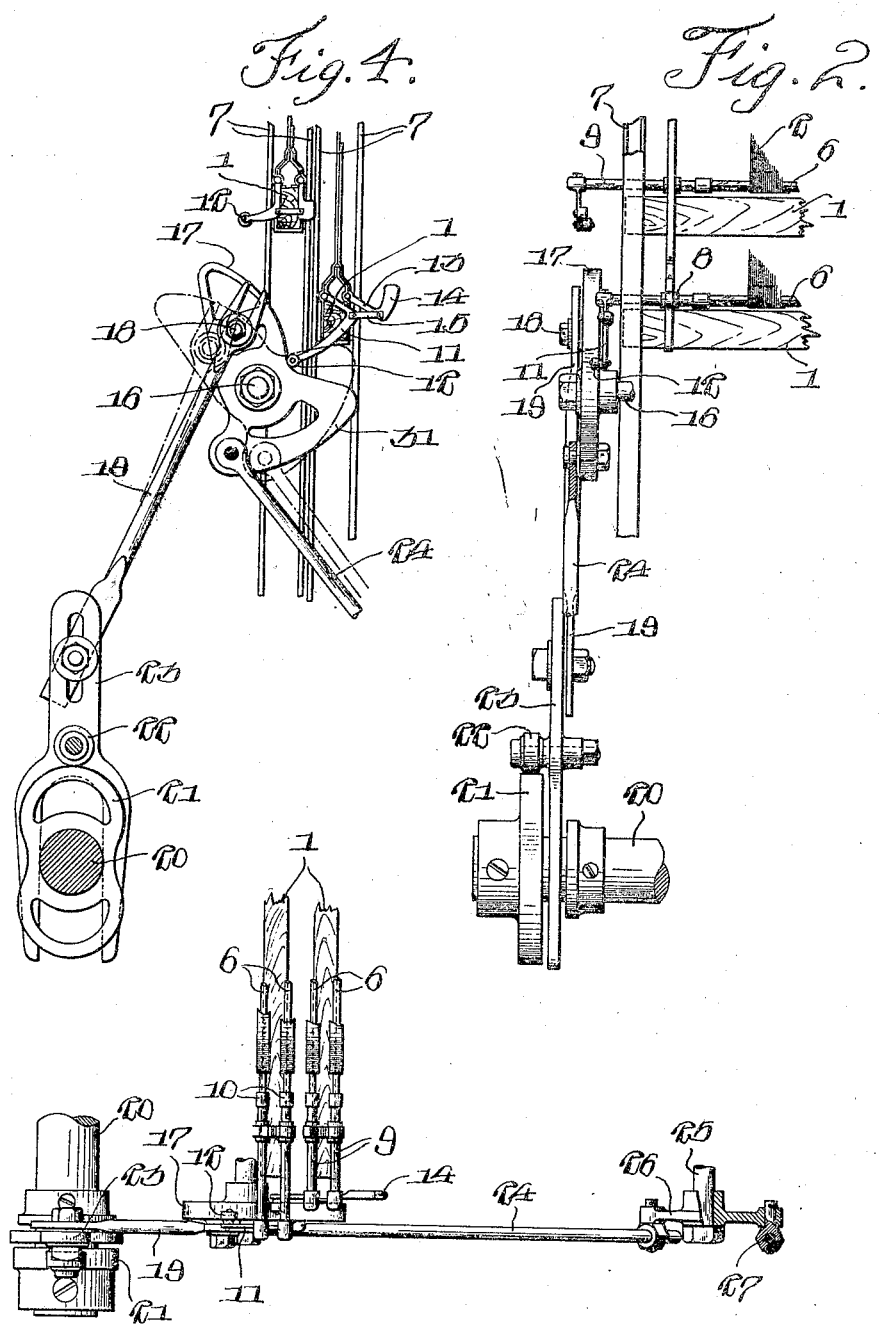

Aug. 23, 1932.    R. MIYATA    1,872,784
DEVICE FOR THE WARP STOP MOTION
Filed March 13, 1931    6 Sheets-Sheet 4

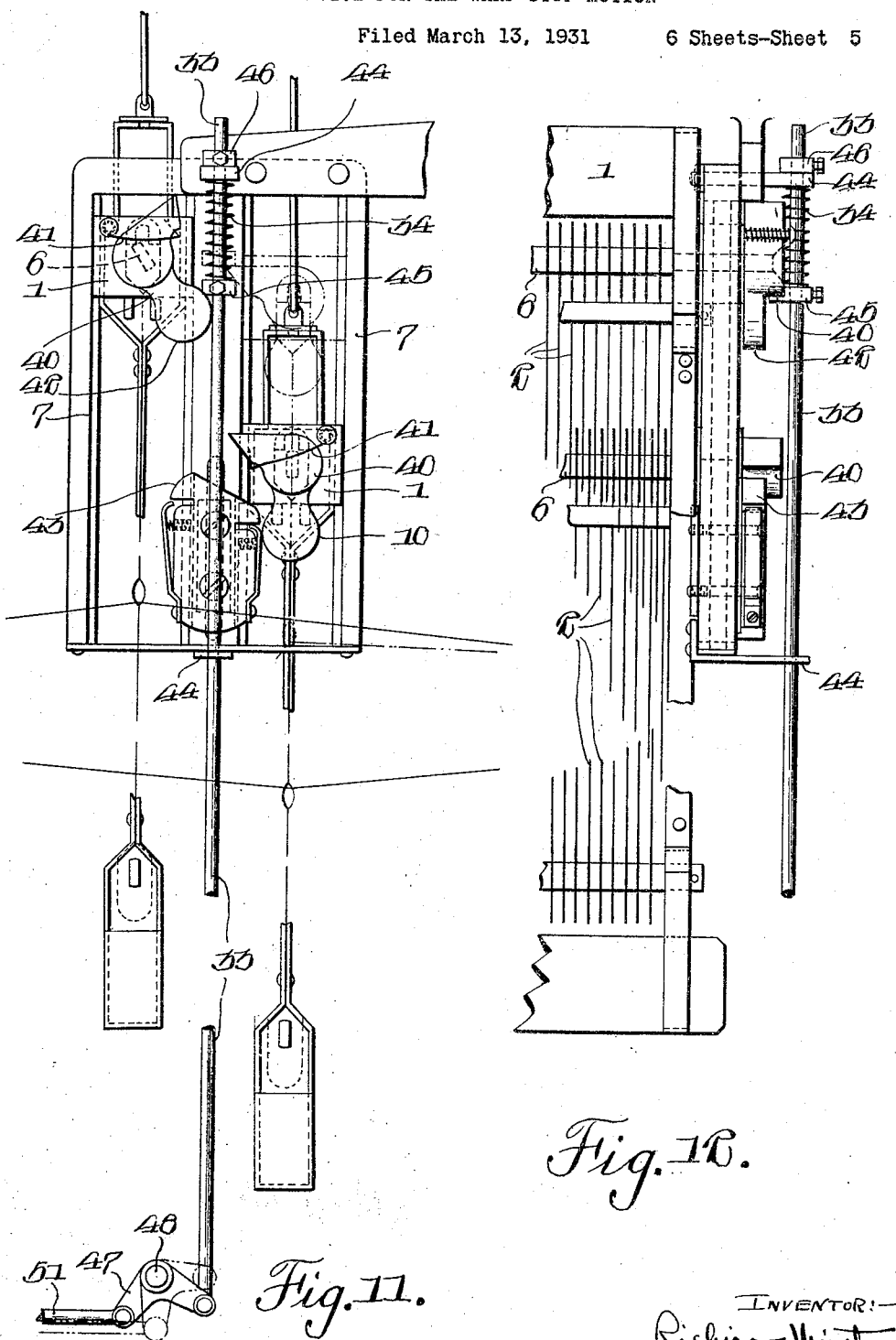

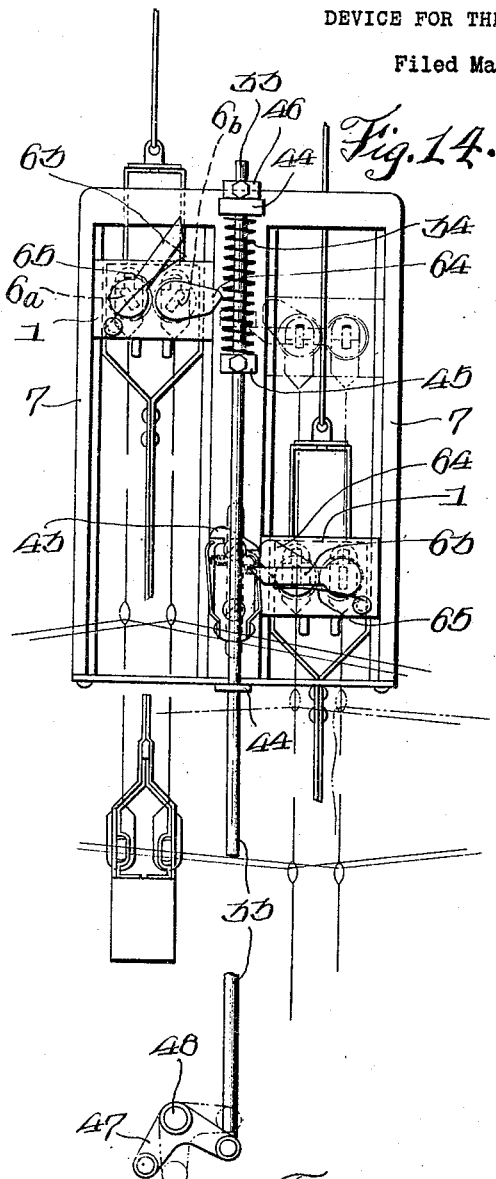
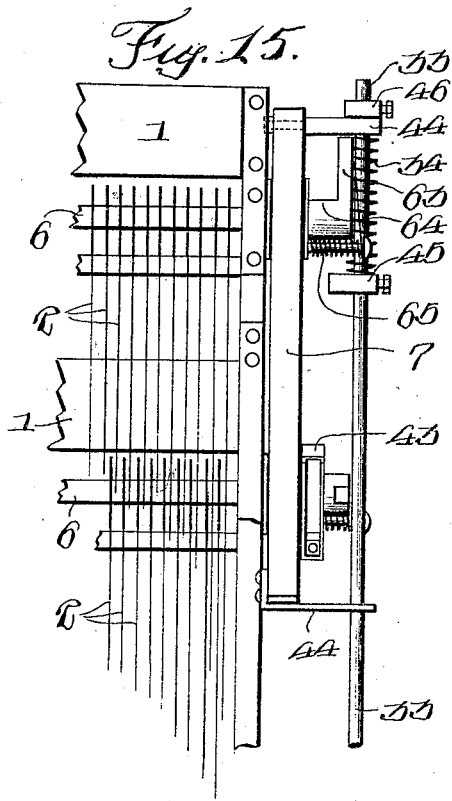
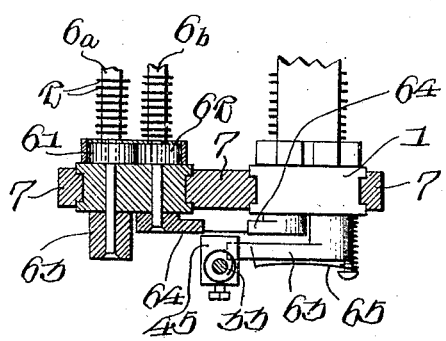
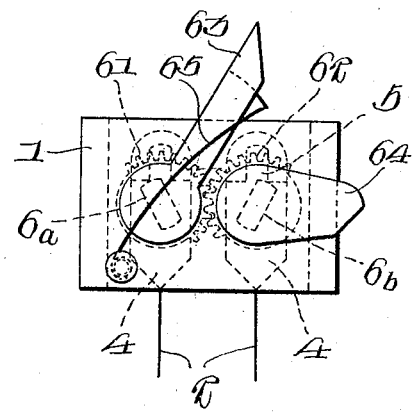

Patented Aug. 23, 1932

1,872,784

UNITED STATES PATENT OFFICE

RISHIRO MIYATA, OF ICHINO-MACHI, SAKAI, OSAKA-FU, JAPAN

DEVICE FOR THE WARP STOP MOTION

Application filed March 13, 1931, Serial No. 522,323, and in Japan April 10, 1930.

This invention relates to an improvement in a device for the warp stop motion, which consists of a transverse bar mounted upon the heald frame, so as to swing through the holes of the healds, the said transverse bar usually remaining inclined in the heald holes; and means to bring the said transverse bar to a substantially vertical position opposite to the reduced hole portion of the healds, when the heald frame is lowered; and means to bring the operating handle of the loom to a stop position by the engagement of the heald with the transverse bar, the same heald having been dropped because of the breakage of a warp.

The primary object of this invention is to provide a mechanism for warp stop motion, which is simple in the construction, effective in the operation, and economizes the cost of manufacture and maintenance, making the usual dropper mechanism superfluous. The heald used in this invention acts as the part of a dropper.

The accompanying drawings show the device according to this invention.

Figure 1:
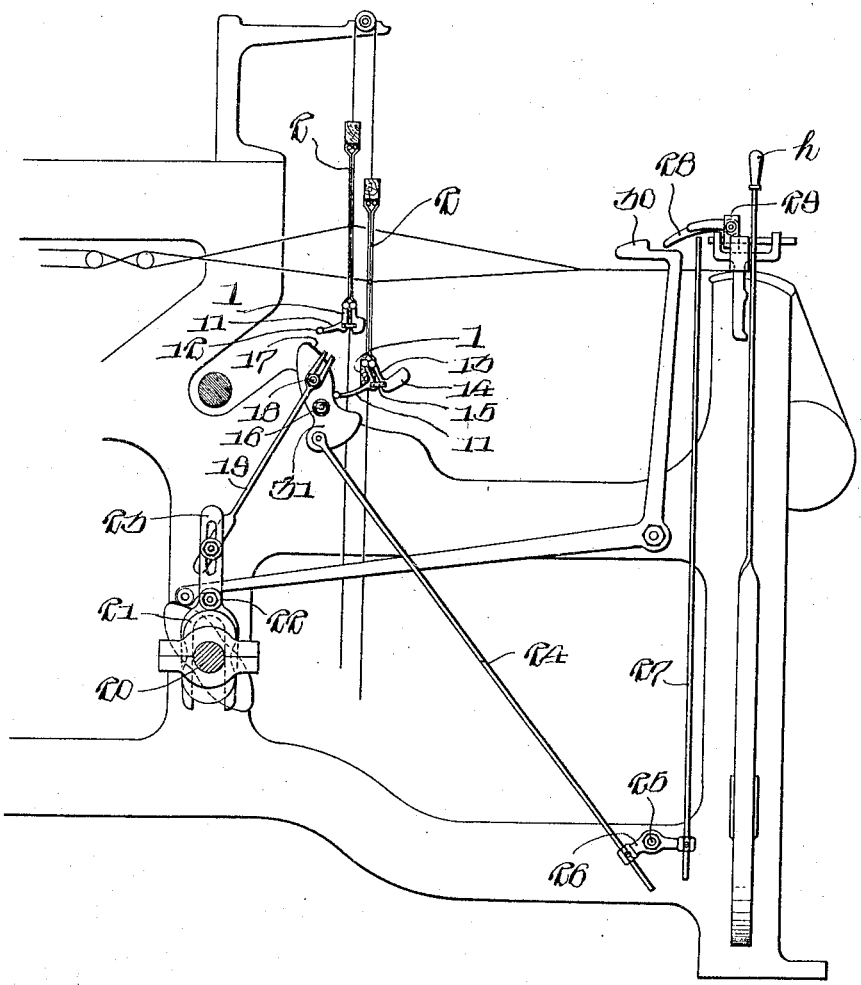
Figure 10:
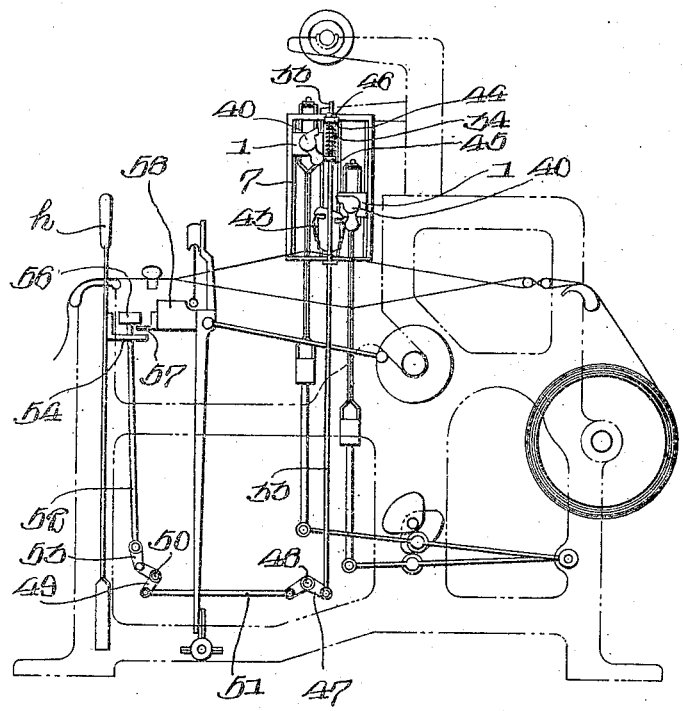
Figure 13:
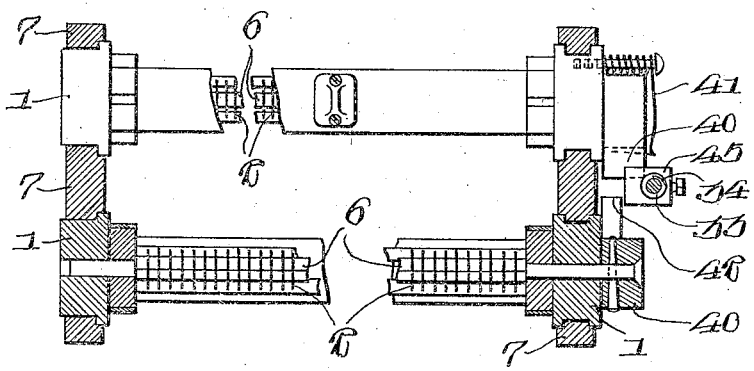

Fig. 1 shows the side elevation of this invention applied to the loom of a single heald frame;

Fig. 2, the partial front-view of the same;

Fig. 3, the plan of the same;

Fig. 4, the detailed side view of the rocking lever;

Figs. 5 and 6, the front and side-views of the important part of the heald frame respectively;

Figs. 7 and 8, the detailed side views showing the operation of the transverse bars at lifted and lowered positions;

Fig. 9, a wire heald which dropped and engaged itself with a transverse bar, when a warp was torn off;

Fig. 10, the side elevation of a loom which has single heald frames, utilized in a modified form of this invention;

Fig. 11, the enlarged side view of the important part of this invention;

Fig. 12, the end view of the same;

Fig. 13, the sectional plan view of the same;

Figs. 14, 15 and 16, the side elevation, the end elevation, and the plan view of a loom, which has double heald frames, utilized in a modified form of this invention; and Fig. 17 a device for simultaneously rocking a pair of transverse bars.

In one form of embodiment of this invention, the heald frame is provided with a pair of transverse bars, which extend through the wire healds, so as to swing in the holes of the healds, because of the up and down movement of the heald frame. The hole through which a vibrating transverse bar passes is narrow in its upper half, and the same narrow part will be engaged with the transverse bar when a heald drops due to the failure of a warp, so that the transverse bar is prevented from swinging. When so stopped, the transverse bar acts as a means for bringing the starting handle to the stop position.

The principal object of this invention is to provide a mechanism for warp stop motion, which is simple in its construction, effective in its operation, and cheap in its expense for manufacture and maintenance, making the usual dropper mechanism superfluous. Not only in the warp stop motion, this mechanism is also effective in reducing or preventing the accidents of warp threads being torn, and so the general efficiency of the loom is increased.

In the drawings, 1 is a heald frame, 2 a wire heald, and 3 the end-member of the same, having a hole 4, the upper half of which is made narrow as 5, 6 is a transverse bar which extends itself through the holes 4 of the wire healds 2. When each heald gets supported by the respective warp thread, the said transverse bar can swing through the hole 4. But when a warp is torn off, the heald hitherto supported by that thread descends of its own weight, and the part 5, reduced in size, of the hole 4 is engaged with the transverse bar 6, when the said bar takes a vertical position.

The heald frame 1 can make a straight up-and-down movement along the guide rail 7. The heald frame 1 is provided with the bearings 8 at its both ends, upon which the shafts 9 are loosely mounted. The inner end of the shafts 9 forms a sleeve 10, into which the said transverse bar 6 is fixed. Upon the outer ends of a pair of shafts 9 are fixed two bent levers 11 and 13, the former having a roller 12 at its one end and the latter a weighted portion 14 on its arm. The bent levers 11 and 13 are interconnected by a link 15, so that they make a parallel motion. In case the roller 12 does not come in contact with the rocking lever to be described later, the vertical portions of these levers will be suspended vertically through the action of the weighted portion 14 as shown in Figs. 6 and 7, and then the transverse bar 6 will take an inclined position in the hole of the wire heald. The cam face 17, coacting with the roller 12, is constituted of a part of the periphery of the rocker lever 31 which is pivoted at 16 to the loom frame. Upon the side of the rocker lever 31 is provided a pin 18, loosely supported between the two arms of the bifurcated rod 19, which is connected to a connecting link 23, so that the latter may move up and down along an appropriate guide means (not shown in the drawings), as a result of the co-operation of a cam 21 fixed to the tappet shaft and of a roller 22. When the connecting link moves upward as shown in Figs. 1 and 4, the bifurcated rod 19 pushes the rocker lever, and rocks it. But when the said connecting link moves downward, the bifurcated rod slides along the pin 18, causing the rocker lever 31 to rock as the cam 17 is pushed by the roller 12.

The connecting rod 24 is connected to the rocker lever 31 at one end, the outer end being connected to a bell crank pivoted to the frame at 25. The bell crank 26 has a push rod 27 fixed to it, the upper end of the same rod being connected to (not shown) or extended under the pawl 28 pivoted to a frame 29 which is fastened to the starting handle $h$ of the loom. When the loom works normally, the pawl 28 repeats up and down movements about its axis. But if the push rod 27 fails to rise, its upper end misses to strike the pawl, but remains in its lowered position, where the hammer 30 can strike the pawl. Then, the hammer strikes the pawl in its backward stroke, when the pawl and the frame 29 are pushed backward and cause the starting handle $h$ to turn back to its stop position.

The following is the manner of operating the above device. During the normal operation of the loom when there is no warp torn off, a pair of the heald frames 1 moves up and down alternately along the guide 7. When the frame moves downward, the roller 12 comes in contact with the cam face 17 of the rocker lever 31, and the bent levers 11 and 13 are forced backward against the weighted portion 14, causing the shaft 9 and the transverse bar 6 to rotate about the axis so as to let the latter take its vertical position, that is to say, the position in which the said bar can be engaged with the reduced portion 5 of the hole 4 of the heald, if any one of the warp threads is broken. In case no warp is broken, the transverse bar 6 remains disengaged with the reduced portion as the heald is suspended by the thread. During the next upward movement of the heald frame, the rocking lever 31 turns itself as shown in the dotted line in Fig. 4, when the roller 12 pushes the cam 17 outward. When the heald frame finishes its upper stroke, the roller 12 gets free from the cam surface, and the transverse bar 6 resumes its original inclined position again. (Then, as the cam 21 rotates and the bifurcated rod 19 takes its lowered position, the rocker lever 31 can swing only through the action of the weighted portion 14.)

As the rocker lever 31 oscillates as described above, the rod 27 is moved upward by means of the connecting rod 24 and the lever 26, and strikes the pawl 28 upward out of the passage of the hammer 30. When this rocker lever returns to its original position by the action of the bifurcated rod 19, the other heald frame moves downward, bringing its roller 12 into contact with the cam 17 of the rocker lever, and causing its bent levers and the transverse bars to swing. At the same time, the rocker lever takes its vertical position by the action of the bifurcated rod 19, and pulls down the rod 27, in consequence of which the pawl 28 swings down into the passage of the hammer.

While no warp thread is broken, the above mentioned parts of the loom repeat the above operation. If, however, any one warp thread is torn off, then the heald through which the said broken thread has been passed, drops downward, and the reduced hole portion of the said heal is engage with the transverse bar, when the same heald frame is lowered, and the transverse bar takes a vertical position (Fig. 8). Consequently, the said reduced hole portion of the heald locks the bent levers 11 and 13 and roller 12 just as they are inclined, so that the roller 12 can give no push to the rocker lever 31, when the said heald frame moves upward next time. The rocker lever thus remains in a vertical position, and the push rod 27 remains stationary, leaving the pawl 28 in the passage of the hammer. If in this condition the hammer 30 moves backwards, it strikes the pawls 28 and forces the handle $h$ to take a stop position.

Figs. 10 to 13 show a modification of this invention, as applied to a loom having single-heald frames, in which also the up-and-down movement of the heald frames causes the transverse bar to oscillate through the holes of the healds. If any warp thread be broken, the same heald drops down and the reduced hole portion of the heald is engaged with the transverse bar and locks it. In this modification the means for oscillating the transverse bar is considerably simplified, while the starting handle is caused to return to the stop position in a much improved way with the simpler construction, so greater efficiency is secured.

The bell crank lever 40 is fixed to one end of the transverse bar 6, which takes the inclined position as shown in a dotted line in Fig. 11 by the action of a spring 41 connected to the heald frame 1 at one end and supporting the bell crank at the other. The lower arm of the bell crank forms a circular cam 42, which is engaged with the cam 43 fixed to the lower middle part of the guide, when the heald frame is lowered and is forced outward, turning the bell crank and the transverse lever to the vertical position. If no warp thread is broken in this condition, the transverse bar 6 is not engaged with the reduced portion of the hole of any heald, the said heald being suspended from a warp thread. Consequently, when the heald frame moves upward next time, the bell crank 40 and the transverse bar 6 return to their original inclined position by the action of the spring 41.

33 is a pull rod which can move up and down through the fixed guides 44. Normally it is, however, pushed downwards through the action of a spring 34, wound around the rod between a guide 44 and a collar 45, until the upper collar 46 touches the guide 44. The lower end of the pull rod 33 is connected to an arm of a bell crank 47 pivoted to the loom frame at 48, and the other arm of the bell crank 47 is connected to another bell crank 49 pivoted to the frame at 50 by a connecting rod 51. The bell crank 49 is in turn connected to a rod 52 by a link 53. The rod 52 passes through an arm 54 fixed to the starting handle $h$ and has a collar 56 fixed at its upper end. A finger or hammer 57 is fixed to the reed 58 of the loom, so that when the collar 56 remains at a lifted position, the said finger 57 may freely pass the space between the collar 56 and the arm 54.

The reed 58 and its finger 57 repeat their forward and backward motion during the normal operation of the loom, but the collar 56 of the rod 52 remains in the space left between the collar and the arm 54. Accordingly, the finger 57 strikes neither the rod 52, nor the collar 56. It moves freely in the same space and causes no action of the handle $h$.

If, however, any warp thread is broken, the heald supported by that thread falls down, and its reduced hole portion 5 is engaged with the transverse bar 6 when the heald frame descends and locks the said bar and the bell crank lever 40. Then, an arm of the bell crank 40 projects inwardly to be engaged with the collar 45. When the heald frame goes upward, the said arm presses the collar 45 upwards against the spring 34, causing the pull rod 33 to pull the bell crank 47. This action is transmitted through the connecting rod 51, the bell crank 49, the link 53 and the rod 52, to the collar 56, which is pulled down to close the space between the collar and the arm 54. Consequently, the finger 57 strikes the collar in the forward movement of the reed, and pushes the handle into a stop position.

This invention can be applied easily also to a loom having double heald frames by making slight changes in the construction or design, as shown in Figs. 14 to 17. In this case, each heald frame 1 is provided with two transverse bars $6a$ and $6b$, which are geared through gears 61 and 62. A pawl 63 is fixed to an outer transverse bar $6a$, and a cam 64 is fixed to an inner tranverse bar $6b$, these pawls and cam overlapping each other. (Fig. 16.) The pawl 63 remains normally in an upward inclined position, as shown in Fig. 14. This result is obtained by the action of a spring 65 connected to the heald frame, when a transverse bar $6a$ inclines at a certain angle in one direction. The other transverse bar $6b$ is made to incline at the same angle in an opposite direction. When the heald frame ascends, the cam 64 projects inwardly as shown in Fig. 14.

When the heald frame descends and the cam 64 comes into contact with the cam 43 fixed to the guide 7, the cam 43 swings upwards, causing the inner transverse bar $6b$ to take a vertical position. This movement is transmitted through gearings 61 and 62 to the outer transverse bar $6a$, and causes the latter to take a vertical position and the pawl 63 to project inwardly. If any heald in this construction falls down, the said heald can be engaged with the same transverse bar, in whatever row the same heald may be. In case a warp or warps break and the heald is engaged with the transverse bar, the pawl 63 is locked in a projected position and can be engaged with the collar 45 fixed to the pull rod 33, when the heald frame ascends. When pulled upwards, the pull rod causes the handle to come to a stop position as already described.

I claim:

1. In a device for warp stop motion having a transverse bar mounted upon the heald frame so as to swing through the holes of the healds, the said transverse bar having a weighted lever and remaining normally inclined in the heald holes by the action of said weighted lever, cam means coming in contact with the said lever so as to bring the said transverse bar to a substantially vertical position opposite a reduced hole portion of the healds when the heald frame descends; means to bring the operating handle of the loom to a stop position by the engagement of the heald with the transverse bar as the latter takes a vertical position, the same heald having been dropped because of the breakage of a warp thread.

2. In a device for warp stop motion having a transverse bar mounted upon the heald frame so as to swing through the holes of the healds, the said transverse bar having a weighted lever and remaining inclined in the heald holes by the action of a weighted lever; vibrating cam means coming in contact with a member of the said lever to bring the said transverse bar to a substantially vertical position opposite a reduced hole portion of the healds when the heald frame descends; and means to support the said vibrating cam means in that position in which it may come into contact with the said lever when descending; a hammer operated by the stop motion, a pawl adapted to engage the hammer, and means for normally moving the pawl out of the path of the hammer said means being ineffective when a warp thread is broken.

3. In a device for warp stop motion having a transverse bar mounted upon the heald frame so as to swing through the holes of the healds, the said transverse bar having a bell crank lever and remaining normally inclined in the heald holes by the action of a spring; fixed cam means coming into contact with the said bell crank lever so as to bring the said transverse bar to a substantially vertical position and to project an arm of the said lever inward when the heald frame descends; a handle for operating the loom, and means to bring the operating handle to a stop position by the engagement of the heald with the transverse bar as the latter takes a vertical position, the same heald having been dropped because of the breakage of a warp thread.

4. In a device for warp stop motion having a transverse bar mounted upon the heald frame so as to swing through the holes of the healds, the said transverse bar having a bell crank lever and remaining normally inclined in the heald holes by the action of a spring; fixed cam means coming into contact with the said bell crank lever to bring the said transverse bar to a substantially vertical position and to project an arm of the said bell crank lever inward when the heald frame descends; a handle for operating the loom, a pull rod adapted to engage the handle, and means to shift the operating handle to a stop position by the engagement of the said inwardly projected arm of the bell crank with the pull rod when the said arm ascends with the heald frame, the said arm being locked in an inwardly projected condition because of the engagement of a reduced hole portion of the heald and the transverse-bar resulting from the breakage of a warp thread.

5. In a device for warp stop motion for looms having a plurality of heald frames, comprising a plurality of transverse bars mounted upon a heald frame so as to swing through the holes of the healds, two transverse bars in the heald holes, one having a pawl and the other a cam normally inclined in two opposite directions; fixed cam means coming in to contact with the said pawl to bring the said transverse bars simultaneously to a substantially vertical position and to project the said pawl inwardly when the heald frame descends; a handle for operating the loom, a pull rod cooperating with the handle, and means to shift the operating handle to a stop position by the engagement of the said pawl with the pull rod, when the said pawl ascends with the heald frame, the said pawl being locked in the said projected position by engagement of a transverse bar with a reduced hole portion of the heald resulting from the breakage of a warp thread.

RISHIRO MIYATA.